June 16, 1959 M. M. PIENTKEWIC 2,890,745
MOBILE FRAME MOUNTED TIRE REMOVING DEVICE
Filed Aug. 16, 1956 2 Sheets-Sheet 1
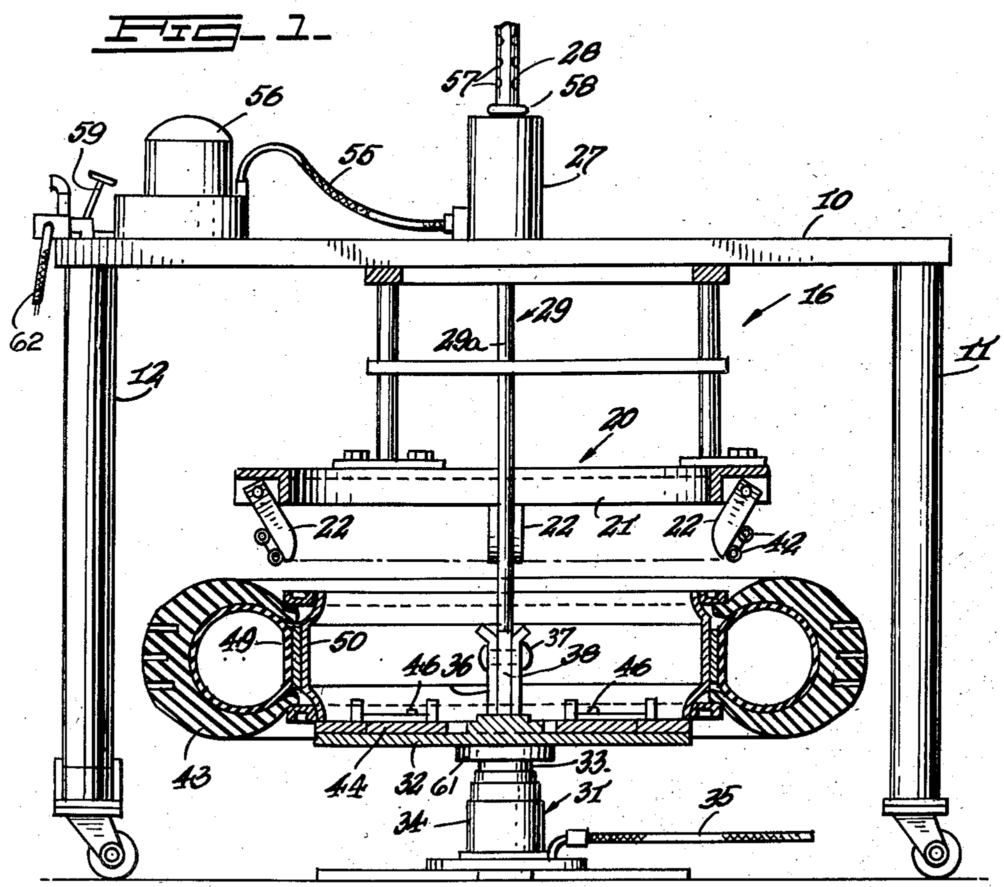
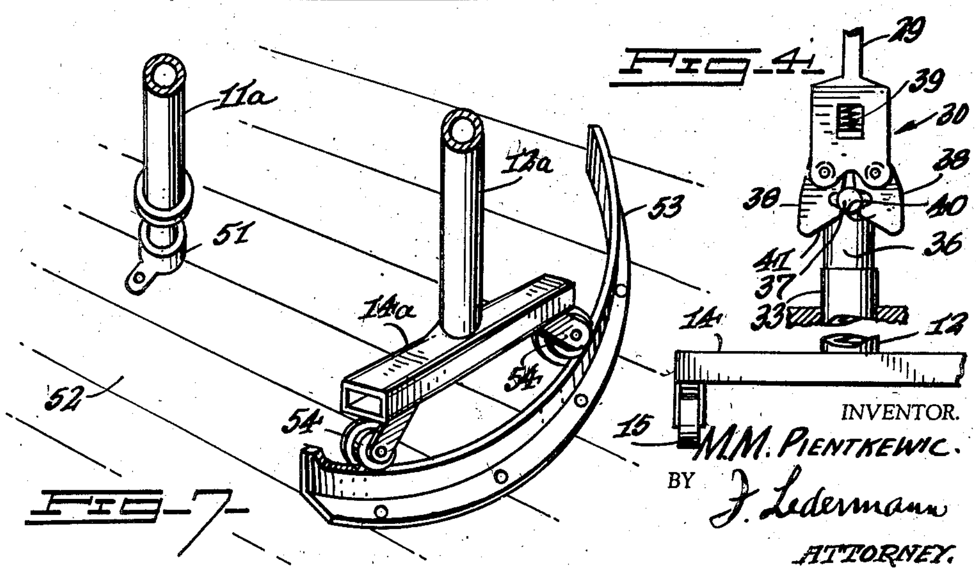
INVENTOR.
M.M. PIENTKEWIC
BY J. Ledermann
ATTORNEY.

June 16, 1959 M. M. PIENTKEWIC 2,890,745
MOBILE FRAME MOUNTED TIRE REMOVING DEVICE
Filed Aug. 16, 1956 2 Sheets-Sheet 2
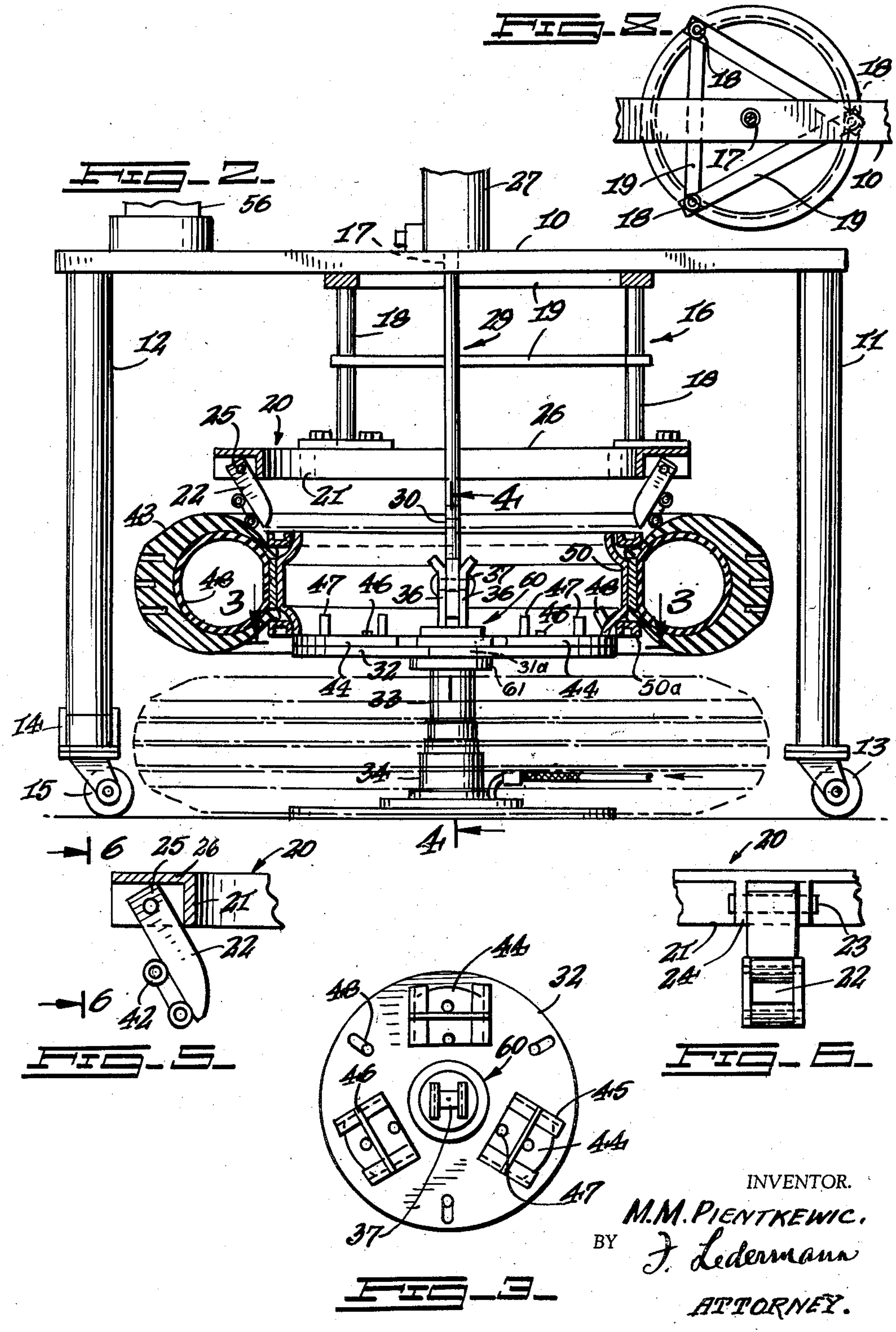
INVENTOR.
M.M. PIENTKEWIC,
BY J. Ledermann
ATTORNEY.

United States Patent Office 2,890,745 Patented June 16, 1959

1

2,890,745

MOBILE FRAME MOUNTED TIRE REMOVING DEVICE

Martin M. Pientkewic, Vulcan, Mich.

Application August 16, 1956, Serial No. 604,447

5 Claims. (Cl. 157—1.2)

This invention relates to devices or apparatus for removing pneumatic tires from their rims or wheels, and is adapted particularly for relatively heavy, or truck, tires.

An object of the invention is the provision of certain new and useful improvements in devices of the type mentioned, and more particularly in the tire removing device disclosed in my Patent No. 2,796,117.

In the device of the above-identified patent, the entire apparatus other than the platform which supports the tired wheel or rim, has to be lifted into position above the latter, and then the vertical rod which is axially positioned with respect to the tire and is adapted to be lifted hydraulically, must be manually engaged with the platform. Upon actuating the said lift rod, the said platform with the tire on it is lifted by the lift rod against the circular member provided with depending fingers adapted to engage the bead of the tire, the tire thus being forced against the said fingers to loosen it from the rim. The improved device of the instant application, on the other hand, provides for a permanent frame including a horizontal support mounted on legs with the said circular member positioned below the said support and with the platform provided with pneumatic power means for lifting the same and hence the tired rim into close proximity with the circular member. Moreover, the interengaging means between the said lifting rod and the platform is such that they are automatically locked together as the platform is lifted to the desired elevation.

Another object of the invention is the provision of means for readily centering the tired rim on the said platform.

The above as well as additional objects will be clarified in the following description wherein reference numerals refer to like-numbered parts in the accompanying drawings. It is to be noted that the drawings are intended solely for the purpose of illustration and that it is therefore neither desired nor intended to limit the invention necesarily to any or all of the exact details of construction or operation except insofar as they may be deemed essential to the invention.

Referring briefly to the drawings, Fig. 1 is a vertical axial sectional view taken through the tire removing device of the present invention, in one position thereof.

Fig. 2 is a view similar to Fig. 1, in another position thereof.

Fig. 3 is a sectional view taken on the line 3—3 of Fig. 2.

Fig. 4 is a fragmentary sectional view taken on the line 4—4 of Fig. 2.

Fig. 5 is an enlargement of a detail of Fig. 1.

Fig. 6 is a view taken on the line 6—6 of Fig. 5.

Fig. 7 is a fragmentary perspective view of the device provided in a modified form of support including a circular or arcuate rail on which one of the supporting legs of the frame rides.

Fig. 8 is a fragmentary plan view of the device of Figs. 1 and 2, with parts omitted.

Referring in detail to the drawing, the numeral 10 indicates a horizontal support mounted on diametrically opposed legs 11 and 12. The former has a single caster 13 thereon, whereas the latter has a beam 14 provided

2 with a caster 15 on each end thereof. Thus the two legs provide stable support for the horizontal support 10.

A triangular frame 16 is provided, secured to the underside of the support 10, with the center of the equilateral triangle vertically aligned with the midpoint of the support 10 in which the opening 17 is provided. The frame 16 consists of the three posts 18 at the apices of the triangle, together with upper and lower lateral ties 19. The frame 16 may be said to be rigidly suspended from the support 10.

A horizontal ring 20, channel-shaped in cross-section, is rigidly secured to the lower ends of the posts 18 with the vertical channel flange 21 spaced radially inward. A plurality of circumferentially spaced fingers 22 are pivotally suspended by means of pins 23 supported in spaced ears 24, from the ring 20, the pins passing through the upper ends of the fingers. The upper extremities 25 of these fingers normally contact the undersurface of the horizontal portion 26 of the ring 20 so that the fingers normally extend downward and radially inward, as shown in Figs. 1 and 2, although they are free to be swung upward toward the horizontal about their pivots, through a very small arc, before being stopped by the flange 21.

A hydraulic ram or lift 27 is mounted on the support 10, operable by oil supplied through a hose 62 from a source, not shown, serves to lift a rod 29 extending downward through the opening 17. On its lower end the rod 29 is provided with an automatic grip 30.

A pneumatic power device 31 is adapted to be positioned on the floor in axial alignment with the rod 29, and it includes the liftable platform 32 adapted to be raised by movement upward of the piston 33 supporting the platform upon entry of air under pressure into the cylinder 34 through the air hose 35, in the well known manner. The piston has a collar 61 thereon spaced from its upper extremity, and the portion extending upward from the collar registers in a central socket **32*a* in the underside of the platform, whence the platform is supported on the collar 61. An axial boss 60 on top of the platform has upwardly extending spaced ears 36 provided with a pin 37 therethrough. The grip 30 comprises two opposed pivoted jaws 38 adapted to register slidably in the space between the ears 36, with spring means, indicated at 39, normally urging the jaws 38 toward each other. The jaws 38 are indented on their juxtaposed sides, as at 40, so that the pin 37 may register in the indentations. The lower edges 41 slope in cam-like fashion so that, as the pin 37 rises and at first contacts the surfaces 41 it causes the jaws 38 to spread, and when the pin registers above these surfaces the jaws automatically close about the pin with the latter registering in the indentations 40. Upon engaging the pin the jaws 38**, while descending, first separate and then close about the pin, and in the latter position the jaws are automatically locked. A lever, not shown, must be tripped by hand to release the jaws from the pin. This form of automatically closing grip is well known.

Spaced rollers 42 are provided on the undersides of the fingers 22 to facilitate longitudinal movement of the latter with respect to the rubber tire 43 as the tire is acted upon by the fingers, as will be described below.

The platform 32 has three plates 44 slidably mounted thereon in radial guides 45. Each pair of guides 45 has a cross-piece 46 approximately intermediate its length, and each slide plate 44 has a pair of spaced upstanding pins 47, each positioned at one side of the cross-piece 46, so that the plates are slidable only the distance between the pins 47 as limit stops. Spaced between the plates 44, upwardly and inwardly sloping arms 48 are mounted on the platform 32.

The assembled tire 43 including its tube 49 is shown mounted on the steel rim 50; it is first set on the platform 32, and the arms 48 serve in an obvious manner to facilitate centering of the tire on the platform. The plates 44 are pulled out to engage the pins 47 with the lock ring 50*a*. Then actuation of the ram 27 will cause the rod 29 to lift the platform slowly but forcibly to engage the fingers 22 against the tire adjacent the rim 50 and to push it with its tube down off the rim 50, thus also dislodging the lock ring.

In the disclosure of my above-mentioned patent, in order to work upon a tire it is necessary to lift the tire-removing device up onto the tire after the tire has been placed on the supporting platform. Thus the device had to be assembled and dismantled for each separate operation. In the instant device the tire-removing machine remains intact, as the tire is first placed in centered position on the platform 32, and the platform is then rapidly raised by the pneumatic lift to position the tire just under the member 20, after which, as stated, the ram 27 takes over and finishes the job. The extended telescopic piston 33 would be too unstable to withstand the force required to remove the tire from the rim. The function of the pneumatic lift is simply to bring the tire rapidly to an elevated position for the fingers on the ring 20 to operate upon it. Hence, by making use of both the pneumatic lift and the hydraulic ram in the manner set forth, there is a substantial saving of time in performing the removal operation.

With the castered legs 11 and 12, it is apparent that the entire device is readily movable about the floor or out of the way when not in use.

For shops that have uneven floors, or dirt to contend with that is knocked off the wheels of vehicles, as well as those who desire precision work, the modified support for the device, shown in Fig. 7, may be used. In this view, parts which are similar or related to parts in the previously described structure, bear the same reference numeral followed by the subscript "*a*." Here the leg 11*a* is made pivotal in any suitable appliance as, for example, a socket 51 secured to the floor 52, and an arcuate rail 53 is also secured to the floor with the socket 51 in the center of curvature of the rail. The beam 14*a* on the leg 12*a* is provided with grooved rollers or the like 54 adapted to ride on the rail 53. This permits of swinging the entire device supported on the legs 11*a* and 12*a* to position it wherever desirable and useful for performing the tire removing operation.

The lift 27 has its piston rod 28 in alignment and integral with the rod 29, and is operable by oil delivered through the hose 55 by an electric pump or compressor 56. To adjust the vertical position of the rod 29 for tires of different sizes, the rod 28 has a series of vertically spaced notches 57 on opposite sides thereof, in which the legs of a U-shaped locking member 58 are adapted to register. As shown in Fig. 1, the member 58 registers in the lowermost pair of notches shown, thus keeping the rod 28 from falling lower and hence holding the rod 29 in the desired position for the particular size tire to be worked upon. A control valve 59, associated with the pump 56, serves to regulate pressure entering the pump. It is to be noted that the hub or boss 60 on top of the platform 32, is provided with a step formation. This accommodates the platform or base to fit wheels with different sizes of hub openings.

It is also to be noted that the air cylinder 31 is provided with a telescoping piston in three sections, of which only the top section 33 has been referred to above as the piston thereof, but it is of course to be understood that by reference above to the piston 33 the telescoping piston is to be inferred.

Obviously, modifications in form or structure may be made without departing from the spirit or scope of the invention.

I claim:

1. A tire removing device including a horizontal support mounted on legs, a frame rigid with and extending downward from said support between said legs, said frame having a horizontal ring rigid with the lower end thereof, said support having an opening therethrough in axial alignment with said ring, said ring having a plurality of circumferentially spaced fingers extending downward and radially inward from the ring, a circular platform adapted to be positioned in axial alignment with said ring, pneumatic means under the platform for raising the platform relatively rapidly, said platform being adapted to have a mounted tire thereon positioned in axial alignment therewith and under the ring and to be raised by said means into close proximity with the lower ends of said fingers, the diameter of the circumscribed circle through said lower ends of the fingers being substantially equal to the largest diameter of the tire rim whereby the fingers are adapted to engage the tire around the rim and the diameter of said circular platform being equal to or less than the largest diameter of said rim, a lifting rod vertically slidable in said opening and hydraulic means for lifting the rod relatively slowly, said platform having an axial upward projection, and means partly on the lower end of the rod and partly on said projection for automatically interlocking the rod and the projection upon raising the tire as aforesaid to said position of close proximity to said fingers whereupon lifting of said rod by said hydraulic means forcibly engages the tire with said fingers to push the tire from the rim.

2. The device set forth in claim 1, said last-named means comprising a bifurcated upper extremity on said projection providing opposed ears, a pin supported in said ears, opposed pivoted jaws suspended from said rod and freely slidable in the space between said ears, the jaws having complementary recesses in which said pin is adapted to register, resilient means normally urging the jaws together, the lower edges of the jaws sloping upward toward said recesses to cause said pin while rising to separate the jaws, said jaws being moved by said resilient means to clamp about said pin when said pin rises to the level of said recesses.

3. The device set forth in claim 1, said legs being two in number and diametrically opposed to each other, one of said legs having a wheel thereon, the other of said legs having a horizontal beam on its lower end, said beam having wheels on the ends thereof.

4. The device set forth in claim 1, said mounted tire having a lock ring thereon, said platform having spaced radial guides thereon, plates slidably mounted in said guides and having longitudinally spaced pins thereon, said plates being slidable from a radially inward position in a radial outward direction to engage one of the pins on each plate with said lock ring to dislodge the same prior to pushing the tire from the rim as aforesaid.

5. The device set forth in claim 1, said hydraulic means comprising a hydraulic ram on said support having said rod extending axially therethrough, the upper end portion of the rod having diametrically opposed transverse grooves arranged in vertically spaced pairs, and a U-bolt having the arms thereof selectively slidably mounted in any one of said pairs of grooves to vary the length of the rod which extends downward below the support by engaging the top of the ram.

References Cited in the file of this patent

UNITED STATES PATENTS

| | | |
|---|---|---|
| 458,191 | Ripley | Aug. 25, 1891 |
| 1,564,496 | Staugaard | Dec. 8, 1925 |
| 1,624,151 | Shevlin | Apr. 27, 1927 |
| 2,485,202 | Kelly | Oct. 18, 1949 |
| 2,562,995 | Watkins | Aug. 7, 1951 |
| 2,614,781 | Engel | Oct. 21, 1952 |
| 2,681,692 | Weaver | June 22, 1954 |
| 2,730,166 | Davidson et al. | Jan. 10, 1956 |

FOREIGN PATENTS

| | | |
|---|---|---|
| 703,086 | Great Britain | Jan. 27, 1954 |